UNITED STATES PATENT OFFICE.

JAMES F. O'BRIEN, OF CHICAGO, ILLINOIS.

EXPLOSIVE.

1,028,952.   Specification of Letters Patent.   Patented June 11, 1912.

No Drawing.   Application filed February 19, 1912.   Serial No. 678,708.

*To all whom it may concern:*

Be it known that I, JAMES F. O'BRIEN, a citizen of the United States, residing at Chicago, in the county of Cook, State of Illinois, have invented certain new and useful Improvements in Explosives, of which the following is a specification.

This invention relates to an explosive of my general class containing a chlorate of an alkali metal, a carbo-hydrate, and a silico-aluminous material; and the invention herein described consists particularly in the use of cereal flour or similar substance for a portion or all of the carbo-hydrates; and it further consists in certain other minor combinations which will be set forth.

I have found by repeated experiment that the combination of a chlorate, a carbo-hydrate and a silico-aluminous material, such as brick dust, cement or the like, produces results heretofore unattainable by a chlorate explosive. It would appear that, prior to my discovery of this general combination, great difficulty was experienced in the handling and use of chlorate explosives on account of their great instability; and my combination of a silico-aluminous material therewith not only obviated the difficulties formerly encountered but also made a new explosive of great efficiency. Further experimentation has shown that the presence of a silico-aluminous material in the explosive compound has enabled me to use such substances as cereal flour to furnish part or all of the carbo-hydrates in the combination. Heretofore it has been generally considered, and it is so stated in numerous authorities, that the presence of the nitrogenous compounds in cereal flour was detrimental to efficient action of a chlorate explosive; but the inclusion of my silico-aluminous material has overcome all objections to this form of carbo-hydrates, and I am enabled to form an explosive compound having all of the advantages of chlorate explosives and having the advantage of cheapness due to the use of carbo-hydrate in the form of the starch contained in a cereal flour.

The cereal flour may be used to supply all or a part of the necessary carbo-hydrate; and I will describe as a preferred form of the explosive a combination in which pure carbo-hydrate in the form of a starch and carbo-hydrate carried by cereal flour are both used. And I will explain another advantage accruing from the use of the cereal flour, with its other constituents besides starch, which advantage I obtain in the highest degree by this specific form of explosive.

In my preferred form of explosive I may use the following ingredients in approximately the proportions by weight indicated:

Potassium chlorate   60 parts
Starch               4 parts
Flour                20 to 25 parts
Brick dust           40 parts
Lamp black           1% of total The figure for the flour will vary somewhat with the character of the flour used, the essential requirement being that the free starch and the carbo-hydrate in the flour shall equal approximately one-third by weight of the chlorate. Also, with flours of different characters, the proportion of free starch and of starch contained in the flour would vary somewhat to obtain the best results. It is possible to entirely omit the free starch.

In the preparation of this explosive the ingredients are simply mixed together by hand or in a suitable machine, sufficient water being added to form the ingredients into a workable mass. And here is where one of the advantages of the flour is conspicuous. The ingredients of the flour other than carbo-hydrates assist greatly in taking up the necessary water and in amalgamating all of the ingredients into a homogeneous mass; so much so that the explosive so constituted becomes extremely simple of manufacture.

When my new explosive is detonated, the nitrogenous compounds of the flour do not deteriorate the action by chemical re-actions which are foreign to the main and fundamental re-actions of combustion. The presence of the silico-aluminous material, in the specific preferred form of brick dust, causes such re-actions of this nitrogenous material which add materially to the explosive energy of the powder. It will thus be seen that I have at once formed a combination which is very cheaply and easily manufactured of inexpensive ingredients and which delivers great energy upon explosion. With this compound I am enabled to obtain explosive energy directly comparable with the explosive energy of dynamite; and my explosive has a majority if not all of the advantages possessed by much more expensive powders now in use.

My explosive, made as above described, either with chlorate, flour and brick dust or in the specific manner set forth in tabulated form, is free from all liability to deterioration; and it cannot be detonated by any agency unless it is confined, and then only by a flame or combination of flame and shock.

The percentage of brick dust in the explosive compound may be greatly varied; and I may use other silico-aluminous materials. But I have found that the calcined clay of brick dust, when finely divided, is very efficient in my explosive. The lamp black cited in the above formula is used primarily as a coating for the finished granules of powder. The powder is first mixed as described, then granulated and dried; and the introduction of the lamp black, or other similar form of carbon, lubricates and insulates the granules and gives them a finished smooth exterior which adds greatly to the appearance of the powder and the ease with which it is handled.

Having described my invention, I claim:

1. An explosive, comprising a chlorate of an alkali metal, a cereal flour, and a silico-aluminous material.

2. An explosive, comprising a chlorate of an alkali metal, a wheat flour, and a silico-aluminous material.

3. An explosive, comprising a chlorate of an alkali metal, wheat flour, and burned clay.

4. An explosive, comprising potassium chlorate, wheat flour, and burned clay.

5. An explosive, comprising potassium chlorate, wheat flour, starch, and burned clay.

6. An explosive, comprising a chlorate of an alkali metal, a cereal flour, a starch, and a silico-aluminous material.

7. An explosive, comprising potassium chlorate, a cereal flour and starch in such proportions that the free starch and that of the cereal flour combined are approximately one third by weight of the chlorate, and a silico-aluminous material.

8. An explosive, comprising potassium chlorate, a cereal flour and starch in such proportions that the free starch and that of the cereal flour combined are approximately one third by weight of the chlorate, and burned clay.

9. An explosive, comprising potassium chlorate, a cereal flour and starch in such proportions that the free starch and that of the cereal flour combined are approximately one third by weight of the chlorate, burned clay, and a small amount of lamp black.

In witness that I claim the foregoing I have hereunto subscribed my name this 12th day of February 1912.

JAMES F. O'BRIEN.

Witnesses:
 JAS. H. BALLAGH,
 JAMES T. BARKELEY.

Copies of this patent may be obtained for five cents each, by addressing the "Commissioner of Patents, Washington, D. C."